United States Patent

Nogami et al.

[11] Patent Number: 6,110,304
[45] Date of Patent: Aug. 29, 2000

[54] HYDROGEN-ABSORBING ALLOY ELECTRODE FOR ALKALINE STORAGE BATTERIES

[75] Inventors: Mitsuzo Nogami; Yoshinori Matsuura; Mamoru Kimoto; Nobuyuki Higashiyama; Mitsunori Tokuda; Takahiro Isono; Ikuo Yonezu; Koji Nishio, all of Osaka, Japan

[73] Assignee: Sanyo Electric Co., Ltd., Osaka, Japan

[21] Appl. No.: 08/749,531

[22] Filed: Nov. 15, 1996

[30] Foreign Application Priority Data

Nov. 17, 1995 [JP] Japan .................................. 7-323975
Nov. 17, 1995 [JP] Japan .................................. 7-323976

[51] Int. Cl.$^7$ .................................................. C22C 19/03
[52] U.S. Cl. ........................ 148/429; 420/900; 75/229; 75/246; 429/59; 429/223
[58] Field of Search .............................. 148/429; 75/229, 75/246; 420/900; 429/59, 101, 223

[56] References Cited

U.S. PATENT DOCUMENTS

| 5,219,678 | 6/1993 | Hasebe et al. . | |
| 5,242,656 | 9/1993 | Zhang et al. | 420/443 |
| 5,468,260 | 11/1995 | Takee et al. . | |
| 5,470,404 | 11/1995 | Yamamoto et al. | 420/900 |
| 5,629,000 | 5/1997 | Matsuura et al. | 420/900 |
| 5,654,115 | 8/1997 | Hasebe et al. | 420/900 |

FOREIGN PATENT DOCUMENTS

| 6089066 | 5/1985 | Japan . |
| 61-176063 | 8/1986 | Japan . |
| 62-154562 | 7/1987 | Japan . |
| 63-146353 | 6/1988 | Japan . |
| 63-264867 | 11/1988 | Japan . |
| 63-291363 | 11/1988 | Japan . |
| 03152868 | 6/1991 | Japan . |

*Primary Examiner*—Deborah Yee
*Attorney, Agent, or Firm*—Birch, Stewart, Kolasch & Birch, LLP

[57] ABSTRACT

The hydrogen-absorbing alloy electrode for alkaline storage batteries according to the invention comprises a hydrogen absorbing alloy powder prepared by grinding a strip of hydrogen absorbing alloy produced by solidifying a molten alloy by a roll method and satisfying the following relations:

$$r/t \leq 0.5 \qquad (1)$$

$$60 \leq t \leq 180 \qquad (2)$$

$$30 \leq r \leq 90 \qquad (3)$$

wherein r represents the mean particle size ($\mu$m) of the hydrogen absorbing alloy powder and t represents the mean thickness ($\mu$m) of the strip absorbing alloy. The hydrogen absorbing alloy electrode of this invention features an improved high-rate discharge characteristic at low temperature.

3 Claims, No Drawings

HYDROGEN-ABSORBING ALLOY ELECTRODE FOR ALKALINE STORAGE BATTERIES

FIELD OF THE INVENTION

The present invention relates to a hydrogen absorbing alloy electrode for alkaline storage batteries which has an excellent high-rate discharge characteristic at low temperature and to a process for producing the same electrode.

BACKGROUND OF THE INVENTION

This application claims the priorities of Japanese Patent Applications No. 7-323975 and No. 7-323976 both filed on Nov. 17, 1995.

In recent years alkaline storage batteries assembled by using a metal compound, such as nickel hydroxide, as the positive electrode material and the new material hydrogen absorbing alloy as the negative electrode material attracted attention as the next-generation alkaline storage batteries replacing nickel-cadmium storage batteries because of their high energy densities per unit weight and unit volume which are conducive to higher discharge capacities.

As the hydrogen absorbing alloy for alkaline storage batteries, usually a hydrogen absorbing alloy powder prepared by solidifying a molten alloy in a mold with cooling water and grinding the solidified molding into a powder (this hydrogen absorbing alloy powder will hereinafter be referred to as the conventional solidification powder) was employed.

However, because the conventional solidification powder is rich in segregation (a variation in concentration of any alloying element), the alloy particles tend to crack as they absorb and release hydrogen in charging and discharging to undergo an increase in specific surface area. Therefore, alkaline storage batteries fabricated using the conventional solidification powder show satisfactory high-rate discharge characteristics in an early phase of cycling but because the loci of segregation tend to function as the origins of oxidative degradation (corrosion). Thus, they generally have the disadvantage of a short cycle life.

To improve the cycle life, it has been proposed to subject the conventional solidification powder to annealing (heat treatment) (Japanese Kokai Tokkyo Koho S60-89066). However, although the annealing of the conventional solidification powder prolongs the cycle life because of decreased segregation, the crystal size (the sum of the thicknesses of two adjacent layers in the lamellar type structure in which a layer rich in a specific element such as a rare earth element and a layer lean in the element alternate) is increased with the result that the particles become resistant to cleavage so that the high-rate discharge characteristic in an early phase of cycling, particularly the high-rate discharge characteristic at low temperature, deteriorates considerably as compared with the untreated powder.

In view of the above conflicting properties of the conventional solidification powder, a hydrogen absorbing alloy powder obtained by grinding a strip of hydrogen absorbing alloy prepared by the roll method (i.e. the method which comprises casting a molten alloy on the peripheral surface of a roll revolving at high speed and allowing it to be quenched in situ) has been proposed as a new hydrogen absorbing material (Japanese Kokai Tokkyo Koho S63-291367).

Since the hydrogen absorbing alloy produced by the roll method is obtained upon quenching of a molten alloy on a roll, the molten metal is least influenced by the gravitational field during solidification so that it features a reduced degree of segregation compared with the conventional solidification powder.

However, the roll side (the side held in contact with the peripheral surface of the roll) of the strip of hydrogen absorbing alloy produced by the roll method as well as the free side (the side opposite to said roll side of the strip of hydrogen absorbing alloy produced by the single-roll method) is not sufficiently microporous and has been more or less oxidized so that when the hydrogen absorbing alloy powder available upon grinding the strip is used directly as the hydrogen absorbing material, the high-rate discharge characteristic, particularly at low temperature, is poor owing to the low activity of the hydrogen absorbing alloy.

SUMMARY OF THE INVENTION

After much research for overcoming the above disadvantages, the inventors of the present invention found that the high-rate discharge characteristic at low temperature can be improved by controlling the mean particle size (r) and mean thickness (t') (which is approximately equal to the mean thickness t of the strip) of hydrogen absorbing alloy. For reference, the conventional particle geometry is t'=10–45 $\mu$m, r=20–50 $\mu$m, and r/t'=greater than 1.

It is an object of the present invention, therefore, to provide a hydrogen absorbing alloy electrode having an improved high-rate discharge characteristic at low temperature.

Meanwhile, as an alternative technology for improving the high-rate discharge characteristic at low temperature, the method has been proposed which comprises grinding the strip of hydrogen absorbing alloy prepared by the roll method to provide a powder and subjecting the powder to surface treatment with an acid or an alkali (Japanese Kokai Tokkyo Koho S63-146353 and Kokai Koho H3-152868).

However, this method has been found to have the drawback that, in the course of surface treatment, the alloying elements dissolve out from the surfaces formed de novo upon grinding of the powder so that the hydrogen absorption capacity (charge-discharge capacity) of the hydrogen absorbing alloy is decreased.

It is another object of the present invention to provide a process for producing a hydrogen absorbing alloy electrode having a high hydrogen absorbing capacity (charge-discharge capacity) and yet an excellent high-rate discharge characteristic at low temperature.

DETAILED DESCRIPTION OF THE INVENTION

The hydrogen absorbing alloy electrode for alkaline storage batteries according to the present invention (electrode of the invention) is an electrode fabricated using, as a hydrogen absorbing material, a hydrogen absorbing alloy powder prepared by grinding a strip of hydrogen absorbing alloy produced by solidifying a molten alloy by the roll method and satisfying all the following relations (1)–(3).

$$r/t \leq 0.5 \tag{1}$$

$$60 \leq t \leq 180 \tag{2}$$

$$30 \leq r \leq 90 \tag{3}$$

wherein r represents the mean particle size ($\mu$m) of the hydrogen absorbing alloy powder and t represents the mean thickness ($\mu$m) of the strip of hydrogen absorbing alloy.

The roll method may be either the single-roll method or the twin-roll method.

The strip of hydrogen absorbing alloy (strip) may be a strip that has been prepared by solidifying a molten metal by the roll method and subjected to heat treatment (annealing) in an inert gas or in vacuo. By the heat treatment, the variation in crystal size in the thickness direction of the strip is decreased to suppress fragmentation on cycling. It should be understood that if the heat-treatment temperature is brought too close to the melting point of the alloy (generally ca 1200° C.), the hydrogen absorbing alloy is partially remelted at grain boundaries to become highly resistant to cracking and is passivated. The heat treatment is generally carried out for about 1–10 hours. The grinding of the strip of hydrogen absorbing alloy may be carried out by mechanical means or by hydrogenation of the hydrogen absorbing alloy.

Fabricated by using, as a hydrogen absorbing material, a hydrogen absorbing alloy powder made available by grinding a strip of hydrogen absorbing alloy produced in a specified thickness by the roll process to a specified mean particle size, the electrode of the present invention has an excellent high-rate discharge characteristic at low temperature. This is because of the following:

The surface produce de novo (de novo faces) upon grinding of a strip of hydrogen absorbing alloy has a large number of minute projections and recesses and, as such, is a surface showing high activity at high-rate discharge at low temperature. In high-rate discharging at low temperature, the velocity of discharge reaction is determined by the rate of diffusion of hydroxide ions in the electrolyte and this velocity of diffusion of hydroxide ions is greater with an increasing number of said minute projections and recesses. On the other hand, the roll side (the side held in contact with the peripheral surface of the roll) and free side (the side opposite to said roll side in the case of the single-roll method) of a strip of hydrogen absorbing alloy produced by the roll method are lean in minute surface irregularities and, furthermore, have been more or less oxidized, with the result that they present surfaces of low activity in the high-rate discharge at low temperature.

Therefore, in order to improve the high-rate discharge characteristic at low temperature, it is a logical course of action to decrease the mean particle size (r) of hydrogen absorbing alloy powder and increase the mean thickness (t) of the strip of hydrogen absorbing alloy, that is to say, reduce the r/t ratio. The relation of $r/t \leq 0.5$ (1) defined hereinbefore is predicated on the above finding.

However, increasing the mean thickness (t) too far leads to an increased variation in crystal size in the thickness direction of the strip of hydrogen absorbing alloy, with the result that the excellent charge-discharge cycle characteristic as the advantage realizable by using the hydrogen absorbing alloy produced by the roll method as a hydrogen absorbing material cannot be obtained. Therefore, from the standpoint of a balance of characteristics, there is a certain preferred range for mean thickness (t). Meanwhile, if the mean particle size (r) is less than 30 μm, the contact resistance of grains of the alloy is increased so that the high-rate discharge characteristic at low temperature is adversely affected by ohmic loss. The relations $60 \leq t \leq 180$ (2) and $30 \leq r \leq 90$ (3) are predicated on the above considerations.

The method of producing a hydrogen absorbing alloy electrode for alkaline storage batteries according to the present invention (method of the invention) comprises a step of solidifying a molten alloy by the roll method to prepare a strip of hydrogen absorbing alloy, a step of subjecting said strip of hydrogen absorbing alloy to surface treatment with an acid, an alkali, or a salt of a strong acid with a strong base and, then, grinding the strip to provide a hydrogen absorbing alloy powder capable of functioning as a hydrogen absorbing material, and a step of coating or impregnating a conductive substrate, e.g. a punched metal, a foamed metal, an expanded metal, or the like, with a kneaded mixture of said hydrogen absorbing alloy powder and a binder and drying it.

The roll method may be either the single-roll method or the twin-roll method. The surface treatment is carried out by immersing the strip of hydrogen absorbing alloy in a bath comprising hydrochloric acid, sulfuric acid, nitric acid, aqueous potassium hydroxide solution, aqueous potassium chloride solution, or the like for a predetermined time. The treating time (immersion time) depends on the kind and concentration of the treating agent but is generally 1–3 hours in the case of 1N-hydrochloric acid, 30 minutes~1 hour when 3N-aqueous potassium hydroxide solution is used, and 1–10 days when 3N-aqueous potassium chloride solution is used. When the surface treatment is carried out with an acid or an alkali, it should be borne in mind that protracting the immersion time too far results in the start of oxidation of the hydrogen absorbing alloy.

The conductive substrate material that can be used includes a porous element of foam-like metal, metallic fiber, carbon fiber, a metal screen, and perforated (punched-out) metal.

Optionally interposed between the above-mentioned step of preparing a strip of hydrogen absorbing alloy and the above-mentioned step of preparing a hydrogen absorbing alloy powder is a step of heat-treating (annealing) the strip of hydrogen absorbing alloy in an inert gas or in vacuo. By this heat treatment, the profile of variation in crystal size in the thickness direction of the strip of hydrogen absorbing alloy is flattened so that the fragmentation on cycling can be suppressed. It should be noticed that bringing the annealing temperature too close to the melting point (generally ca 1200° C.) of the alloy would cause partial redissolution of the hydrogen absorbing alloy at the crystal grain boundaries so that it would resist cracking and become passivated. This heat treatment is carried out generally for about 1–10 hours.

Since, in the process of the invention, the surface treatment of the strip of hydrogen absorbing alloy produced by a roll method is carried out prior to grinding, release of alloying elements (e.g. the rare earth element) into the surface treatment bath is suppressed. Therefore, in accordance with the present invention, the activity of the roll side and free side of the strip of hydrogen absorbing alloy can be enhanced without incurring a loss of its hydrogen absorbing capacity.

EXAMPLES

The following examples are intended to illustrate the present invention only in further detail and should by no means be construed as defining the scope of the invention. Thus, many changes and modifications may be made by one skilled in the art without departing from the spirit and scope of the invention.

Experiment 1

This experiment was undertaken to investigate the relationship of the mean thickness t (μm) of a strip of hydrogen absorbing alloy produced by the roll method and the mean particle size r (μm) of the hydrogen absorbing alloy powder available upon grinding of the strip with the high-rate discharge characteristic at low temperature.

Preparation of Hydrogen Absorbing Alloy Powders

Alloying metals (all not less than 99.9% pure) were weighed and mixed and the mixture was melted under Ar gas in a high-frequency furnace. The molten alloy was solidified by a single-roll method (roll diameter: 350 mm) or a twin-roll method (roll diameter: 250 mm) to prepare strips of hydrogen absorbing alloy of the compositional formula MmNi$_{3.4}$Co$_{0.8}$Al$_{0.3}$Mn$_{0.5}$. Several strips were heat-treated at 800° C. for 3 hours. For these strips of hydrogen absorbing alloy, the thickness was measured at 100 randomized points to find the mean thickness (arithmetic mean). Then, these hydrogen absorbing alloy strips were respectively ground mechanically under Ar gas to provide hydrogen absorbing alloy powders. For each of the hydrogen absorbing powders, the mean particle size was determined by the laser diffraction method.

Fabrication of Hydrogen Absorbing Alloy Electrodes

A slurry was prepared by mixing 90 parts by weight of each hydrogen absorbing alloy powder obtained above with 10 parts by weight of 2.5 weight % aqueous polyethylene oxide solution and both sides of a perforated metal grid of nickel-plated steel were coated with the above slurry and dried to provide a hydrogen absorbing alloy electrode.

Construction of Alkaline Storage Batteries

Using the above hydrogen absorbing alloy electrodes as negative electrodes, alkaline storage cells (cell capacity: ca 1200 mAh) A1~A12 and B1~B10 of AA size (U 3), which had a relatively large negative electrode capacity compared with the positive electrode, were assembled. In cells A1~A12, the electrode of the invention was employed, while cells B1~B10 were assembled using the comparative electrode. The conventional unsintered nickel electrode was invariably used as the positive electrode, a polyamide nonwoven fabric as the separator, and a 30 weight % aqueous solution of potassium hydroxide as the alkaline electrolyte. The method of solidifying the hydrogen absorbing alloy (single-roll or twin-roll), heat treatment, roll peripheral speed (cm/sec.), mean strip thickness t ($\mu$m), mean particle size r ($\mu$m), and r/t ratio for each cell are presented in Tables 1 and 2.

TABLE 1

| | Solidification method | Heat treatment | Peripheral speed of roll (cm/sec) | Mean strip thickness t ($\mu$m) | Mean particle size r ($\mu$m) | r/t | Discharge capacity (mAh) |
|---|---|---|---|---|---|---|---|
| Cell A1 | Single-roll | Untreated | 500 | 180 | 90 | 0.5 | 920 |
| Cell A2 | Single-roll | Untreated | 800 | 150 | 75 | 0.5 | 930 |
| Cell A3 | Single-roll | Treated | 800 | 150 | 75 | 0.5 | 940 |
| Cell A4 | Single-roll | Untreated | 1000 | 100 | 50 | 0.5 | 950 |
| Cell A5 | Single-roll | Untreated | 1000 | 100 | 40 | 0.4 | 950 |
| Cell A6 | Single-roll | Untreated | 1000 | 100 | 30 | 0.3 | 960 |
| Cell A7 | Single-roll | Treated | 1000 | 100 | 50 | 0.5 | 950 |
| Cell A8 | Single-roll | Treated | 1000 | 100 | 40 | 0.4 | 940 |
| Cell A9 | Single-roll | Treated | 1000 | 100 | 30 | 0.3 | 960 |
| Cell A10 | Single-roll | Untreated | 1500 | 60 | 30 | 0.5 | 950 |
| Cell A11 | Single-roll | Treated | 1500 | 60 | 30 | 0.5 | 940 |
| Cell A12 | Twin-roll | Untreated | 1800 | 100 | 40 | 0.4 | 920 |

TABLE 2

| | Solidification method | Heat treatment | Peripheral speed of roll (cm/sec) | Mean strip thickness t ($\mu$m) | Mean particle size r ($\mu$m) | r/t | Discharge capacity (mAh) |
|---|---|---|---|---|---|---|---|
| Cell B1 | Single-roll | Untreated | 300 | 200 | 100 | 0.5 | 800 |
| Cell B2 | Single-roll | Untreated | 500 | 180 | 100 | 0.5 | 740 |
| Cell B3 | Single-roll | Untreated | 800 | 150 | 90 | 0.6 | 670 |
| Cell B4 | Single-roll | Untreated | 1000 | 100 | 60 | 0.6 | 760 |
| Cell B5 | Single-roll | Treated | 1000 | 100 | 60 | 0.6 | 770 |
| Cell B6 | Single-roll | Untreated | 1500 | 60 | 40 | 0.67 | 740 |
| Cell B7 | Single roll | Treated | 1500 | 60 | 40 | 0.67 | 760 |
| Cell B8 | Single roll | Untreated | 1500 | 60 | 20 | 0.33 | 780 |
| Cell B9 | Single-roll | Untreated | 1800 | 50 | 25 | 0.5 | 770 |
| Cell B10 | Twin-roll | Untreated | 1000 | 100 | 60 | 0.6 | 750 |

The Low-temperature High-rate Discharge Capacity of Each Storage Battery

Cells A1~A12 and cells B1~B10 were charged at 120 mA for 16 hours at room temperature (ca 25° C.) and discharged to 0.95 V at 120 mA and 60° C. for activation.

Then, each cell was charged at 1200 mA for 1.1 hours, allowed to stand at −10° C. for 2 hours, and then discharged to 0.85 V at 1200 mA and −10° C. to determine the low-temperature high-rate discharge capacity of each cell. The results are also shown in Table 1 or 2.

It is clear that compared with cells B1~B10 in Table 2, cells A1~A12 in Table 1 have larger high-rate discharge capacities indicating their superior low-temperature high-rate discharge characteristics. This finding indicates that hydrogen absorbing alloy electrodes exhibiting improved high-rate discharge characteristics at low temperature can be fabricated by using hydrogen absorbing alloy powders having the mean particle size r, mean thickness t, and r/t ratio within the herein-defined ranges as hydrogen absorbing materials.

While a hydrogen absorbing alloy in the Mm.Ni.Co.Al.Mn series was used in the above experiment 1, there is no particular restriction to the kinds of hydrogen absorbing alloys that can be used.

Example 2

This experiment was designed and performed to ascertain the degree of difference that would be produced in the high-rate discharge capacity at low temperature between the case in which a strip of hydrogen absorbing alloy was surface-treated prior to grinding and the case in which no surface treatment was carried out.

Production Example 1
Preparation of a Hydrogen Absorbing Alloy Powder

Alloying metals (all not less than 99.9% pure) were weighed and mixed and the mixture was melted under Ar gas in a high-frequency furnace. The molten alloy was solidified by the single-roll method (roll dia. 350 mm) to prepare a strip (thickness=ca. 0.1 mm) of hydrogen absorbing alloy of the compositional formula MmNi$_{3.4}$Co$_{0.8}$Al$_{0.3}$Mn$_{0.5}$. This strip of hydrogen absorbing alloy was surface-treated by immersing it in twice its weight of 1N-hydrochloric acid for 1 hour and, then, ground mechanically under Ar gas to provide a hydrogen absorbing alloy powder with a mean particle size of 50 $\mu$m. The BET specific surface area of the above strip of hydrogen absorbing alloy after the surface treatment was 0.31 m$^2$/g.

Fabrication of a Hydrogen Absorbing Alloy Electrode

A slurry was prepared by mixing 90 parts by weight of the hydrogen absorbing alloy powder obtained above with 10 parts by weight of 2.5 weight % aqueous polyethylene oxide solution and both sides of a perforated nickel-plated steel sheet were coated with the above slurry and dried to provide a hydrogen absorbing alloy electrode.

Assembly of Alkaline Storage Batteries

Using the above hydrogen absorbing electrode as a negative electrode, alkaline storage cells (cell capacity: ca 1200 mAh) X1 of AA size (U 3), which had a sufficiently larger negative electrode capacity compared with the positive electrode, were fabricated. Cell X1 was fabricated using the electrode manufactured by the process of the invention. The conventional unsintered nickel electrode was used as the positive electrode, a polyamide nonwoven fabric as the separator, and a 30 weight % aqueous solution of potassium hydroxide as the alkaline electrolyte.

Production Example 2

Alkaline storage cell X2 was assembled in the same manner as in Production Example 1 except that the strip of hydrogen absorbing alloy was heat-treated prior to the surface treatment. In Cell X2, the electrode manufactured by the process of the invention was used. The heat treatment was carried out at 800° C. for 3 hours. The BET specific surface area of the above strip of hydrogen absorbing alloy after surface treatment was 0.32 $m^2/g$.

Production Example 3

Alkaline storage cell X3 was assembled in the same manner as in Production Example 1 except that the strip of hydrogen absorbing alloy was surface-treated by immersing it in twice its weight of 3N-aqueous potassium hydroxide solution for 30 minutes. In Cell X3, the electrode manufactured by the process of the invention was used. The BET specific surface area of the above strip of hydrogen absorbing alloy after surface treatment was 0.29 $m^2/g$.

Production Example 4

Alkaline storage cell X4 was assembled in the same manner as in Production Example 1 except that the strip of hydrogen absorbing alloy was surface-treated by immersing it in twice its weight of 3N-aqueous potassium chloride solution held at 100° C. for 1 day. In cell X4, the electrode manufactured by the process of the invention was used. The BET specific surface area of the strip of hydrogen absorbing alloy after surface treatment was 0.21 $m^2/g$.

Production Example 5

Alkaline storage cell X5 was assembled in the same manner as in Production Example 1 except that the twin-roll method (roll dia. 250 mm) was used in lieu of the single-roll method. In cell X5, the electrode manufactured by the process of the invention was used. The BET specific surface area of the above strip of hydrogen absorbing alloy after surface treatment was 0.31 $m^2/g$.

Comparative Production Example 1

Alkaline storage cell Y1 was assembled in the same manner as in Production Example 1 except that the strip of hydrogen absorbing alloy was not surface-treated. In cell Y1, the comparative electrode was used. The BET specific surface area of the above strip of hydrogen absorbing alloy was 0.16 $m^2/g$.

Comparative Production Example 2

Alkaline storage cell Y2 was assembled in the same manner as in Production Example 1 except that strip of hydrogen absorbing alloy was heat-treated and not surface-treated. In cell Y2, the comparative electrode was used. The heat treatment was carried out 800° C. for 3 hours. The BET specific surface area of the above strip of hydrogen absorbing alloy after heat treatment was 0.15 $m^2/g$.

Comparative Production Example 3

Alkaline storage cell Y3 was assembled in the same manner as in Production Example 5 except that the strip of hydrogen absorbing alloy was not surface-treated. In cell Y3, the comparative electrode was employed. The BET specific surface area of the above strip of hydrogen absorbing alloy was 0.12 $m^2/g$.

The Low-temperature High-rate Discharge Capacity of Each Storage Battery

Cells X1~X5 and cells Y1~Y3 were respectively charged at 120 mA for 16 hours at room temperature (ca 25° C.) and discharged to 0.95 V at 120 mA and 60° C. for activation.

Then, each cell was charged at 1200 mA for 1.1 hours, allowed to stand at −10° C. for 2 hours, and then discharged to 0.85 V at 1200 mA and −10° C. to determine the low-temperature high-rate discharge capacity of each cell. The results are shown in Table 3.

TABLE 3

| | Solidification method | Heat treatment | Strip treated by | Specific surface area of strip ($m^2/g$) | Discharge capacity (mAh) |
| --- | --- | --- | --- | --- | --- |
| Cell X1 | Single-roll | Untreated | One-hr immersion in 1N-HCl | 0.31 | 910 |
| Cell X2 | Single-roll | Treated | One-hr immersion in 1N-HCl | 0.32 | 900 |
| Cell X3 | Single-roll | Untreated | 30-min. immersion in 3N-KOH | 0.29 | 890 |
| Cell X4 | Single-roll | Untreated | One-day immersion in 3N-KCl at 100° C. | 0.21 | 840 |
| Cell X5 | Twin-roll | Untreated | One-hr immersion in 1N-HCl | 0.31 | 910 |
| Cell Y1 | Single-roll | Untreated | Untreated | 0.16 | 780 |
| Cell Y2 | Single-roll | Treated | Untreated | 0.15 | 760 |
| Cell Y3 | Twin-roll | Untreated | Untreated | 0.12 | 710 |

It is clear from Table 3 that compared with cells Y1~Y3, cells X1~X5 have larger high-rate discharge capacities indicating their superior high-rate discharge characteristics at low temperature.

While a hydrogen absorbing alloy in the Mm.Ni.Co.Al.Mn series was used in the above experiment 2, there is no particular restriction to the kinds of hydrogen absorbing alloys that can be used.

Experiment 3

This experiment was performed to investigate the difference in discharge capacity between the case in which the surface treatment of hydrogen absorbing alloy was carried out before grinding and the case in which the surface treatment was carried out after grinding.

As the cell corresponding to the case in which the surface treatment of hydrogen absorbing alloy was carried out before grinding, cell X1 was used. On the other hand, cell Y4 was assembled in the same manner as cell X1 (Production Example 1) except that the surface treatment was carried out after grinding. In cell Y4, the comparative electrode was used. The BET specific surface area of the strip of hydrogen absorbing alloy after surface treatment was 0.65 m²/g.

Discharge Capacity

Cell X1 and cell Y4 were respectively charged at 120 mA for 16 hours at room temperature (ca 25° C.) and, then, discharged to 0.95 V at 120 mA and 60° C. for activation.

Then, each cell was charged at 1200 mA for 1.1 hours, allowed to stand at −10° C. for 2 hours, and then discharged to 0.85 V at 1200 mA and −10° C. to determine the discharge capacity of the cell. As a result, the discharge capacity of cell X1 was found to be 910 mAh and that of cell Y4 was found to be 700 mAh. The reason for the relatively small discharge capacity of cell Y4 compared with cell X1 was that because the surface treatment was carried out after grinding, the alloying elements dissolved out into the bath for surface treatment to cause an increase in specific surface area and, hence, excessive activation so that the powder reacted with oxygen in the air and was passivated during fabrication of the electrode.

The electrode of the present invention has an excellent high-rate discharge characteristic at low temperature because the hydrogen absorbing alloy powder prepared by grinding a strip of hydrogen absorbing alloy produced by the roll method and having a specified mean thickness to a specified mean particle size is used as a hydrogen absorbing material. Moreover, since the surface treatment of the strip of hydrogen absorbing alloy obtained by the roll method is carried out before grinding, the alloying elements (e.g. rare earth elements) are least likely to dissolve out into the surface treatment bath. Therefore, in accordance with the process of the invention, the activity of the roll and free sides of the strip of hydrogen absorbing alloy can be enhanced without entailing a loss of the hydrogen absorbing capacity of the powder, with the result that a hydrogen absorbing alloy electrode with a large capacity and an improved high-rate discharge characteristic at low temperature can be provided.

What is claimed is:

1. A hydrogen absorbing alloy electrode for alkaline storage batteries which comprises as a hydrogen absorbing material a hydrogen absorbing alloy powder consisting essentially of Mm, Ni, Co, Al and Mn prepared by grinding a strip of the hydrogen absorbing alloy produced by solidifying the molten alloy by the roll method and wherein said hydrogen absorbing alloy powder satisfies the following relations:

$$r/t \leq 0.5 \quad (1)$$

$$60 \leq t \leq 180 \quad (2)$$

$$30 \leq r \leq 90 \quad (3)$$

wherein r represents the mean particle size ($\mu$m) of the hydrogen absorbing alloy powder and t represents the mean thickness ($\mu$m) of the strip of hydrogen absorbing alloy.

2. The hydrogen absorbing alloy electrode for alkaline storage batteries according to claim 1 wherein said strip of hydrogen absorbing alloy is a strip heat-treated either in an inert gas or in vacuo.

3. A hydrogen absorbing alloy electrode for alkaline storage batteries which comprises as a hydrogen absorbing material a hydrogen absorbing alloy powder comprising Mm.Ni.Co.Al.Mn prepared by grinding a strip of the hydrogen absorbing alloy produced by solidifying the molten alloy by the roll method and wherein said hydrogen absorbing alloy powder satisfies the following relations:

$$r/t \leq 0.5 \quad (1)$$

$$60 \leq t \leq 180 \quad (2)$$

$$30 \leq r \leq 90 \quad (3)$$

wherein r represents the mean particle size ($\mu$m) of the hydrogen absorbing alloy powder and t represents the mean thickness ($\mu$m) of the strip of hydrogen absorbing alloy.

* * * * *